(12) United States Patent
Bontrager et al.

(10) Patent No.: US 6,205,755 B1
(45) Date of Patent: Mar. 27, 2001

(54) QUICK CHANGE BLADE ASSEMBLY FOR A ROTARY MOWER

(75) Inventors: Robert C. Bontrager; Richard J. Pitman, both of Nashville; Paul L. Scott, Brentwood, all of TN (US)

(73) Assignee: Murray, Inc., Brentwood, TN (US)

( * ) Notice: Subject to any disclaimer, the term of this patent is extended or adjusted under 35 U.S.C. 154(b) by 0 days.

(21) Appl. No.: 09/376,297

(22) Filed: Aug. 18, 1999

Related U.S. Application Data
(60) Provisional application No. 60/130,943, filed on Apr. 26, 1999.

(51) Int. Cl.[7] .......................... A01D 34/03; A01D 34/43; A01D 34/64
(52) U.S. Cl. ................................. 56/17.5; 56/295
(58) Field of Search ........................ 464/32, 33; 403/2, 403/260, 353; 30/327; 56/295, 17.5, 12.7, 11.7, 255, DIG. 17, DIG. 20

(56) References Cited

U.S. PATENT DOCUMENTS

| | | |
|---|---|---|
| 2,875,569 | 3/1959 | Sauer . |
| 3,670,413 | 6/1972 | Weber . |
| 3,783,591 * | 1/1974 | Sotak et al. ...................... 56/10.2 |
| 3,875,728 * | 4/1975 | Bacon ................................ 56/17.5 |
| 3,877,146 | 4/1975 | Pittinger . |
| 4,035,994 * | 7/1977 | Hoff ................................... 56/11.3 |
| 4,041,679 * | 8/1977 | Seifert et al. ...................... 56/11.3 |
| 4,055,935 * | 11/1977 | Malion et al. ..................... 56/10.3 |
| 4,084,397 * | 4/1978 | McGrath ............................ 56/255 |
| 4,088,210 * | 5/1978 | Hoff .................................. 192/17 D |
| 4,090,345 * | 5/1978 | Harkness ........................... 56/10.5 |
| 4,229,933 | 10/1980 | Bernard . |
| 4,586,257 | 5/1986 | Rittenhouse . |
| 4,712,364 | 12/1987 | Oxley . |
| 4,771,593 | 9/1988 | Lee . |
| 4,936,884 | 6/1990 | Campbell . |
| 5,456,095 | 10/1995 | Tawil et al. . |
| 5,581,985 * | 12/1996 | Secosky ............................ 56/10.3 |
| 5,724,796 * | 3/1998 | Plamper ............................ 56/17.5 |
| 5,862,598 | 1/1999 | Lee . |

FOREIGN PATENT DOCUMENTS

| | | |
|---|---|---|
| 0 438 611 | 7/1991 | (EP) . |
| 0 676 127 | 10/1995 | (EP) . |
| 1 562 948 | 3/1980 | (GB) . |

* cited by examiner

*Primary Examiner*—Robert E. Pezzuto
*Assistant Examiner*—Arpad Fabian Kovacs
(74) *Attorney, Agent, or Firm*—Pillsbury Winthrop LLP

(57) ABSTRACT

A blade is secured to a blade adapter which is dimensioned to receive a fixed adapter. The fixed adapter is connected to the engine drive shaft of a rotary mower. The blade and fixed adapter are provided with cooperating surfaces which permit the adapters to be selectively locked together and separated from each other without requiring tools.

6 Claims, 4 Drawing Sheets

QUICK CHANGE BLADE ASSEMBLY FOR A ROTARY MOWER

This application claims the benefit of U.S. Provisional Application Ser. No. 60/130,943, filed Apr. 26, 1999.

BACKGROUND OF THE INVENTION

1. Field of the Invention

The present invention relates to an assembly which permits a blade to be attached to and removed from a rotary mower without the use of tools.

2. Prior Art

Currently, to sharpen or replace a mower blade for a rotary mower requires that the blade be removed from the mower using a wrench or socket to loosen a bolt which secures the blade to the mower. This can be difficult when there has been a build-up of debris around the blade bolt or when moisture has caused rust which locks the bolt in place. Also, it can be hazardous if the wrench or socket slips off the bolt's head during blade attachment or removal thereby causing one's hand to strike the mower blade housing or the sharpened edge of the blade.

SUMMARY OF THE INVENTION

The present invention provides a mower blade assembly which permits the blade of a rotary mower to be attached to and removed from the mower without the use of tools. This is accomplished by securing the blade to a blade adapter and securing a fixed adapter to the mower. The respective adapters are formed so that they may be selectively interlocked with one another by a connection not requiring tools. As a result, the blade can be quickly attached to or removed from the mower by hand without the difficulties and potential for injury existent in conventional blade-changing arrangements.

The assembly just described permits the user to remove a blade easily so that it can be sharpened or replaced and then resecured to the mower. Such an assembly also allows the user to readily substitute between different types of blades, viz., between blades which are designed for particular applications, such as mulching, bagging and side discharge.

BRIEF DESCRIPTION OF THE DRAWINGS

The invention now will be described in further detail with respect to the accompanying drawings wherein.

DETAILED DESCRIPTION OF A PREFERRED EMBODIMENT OF THE INVENTION

Figure 1:
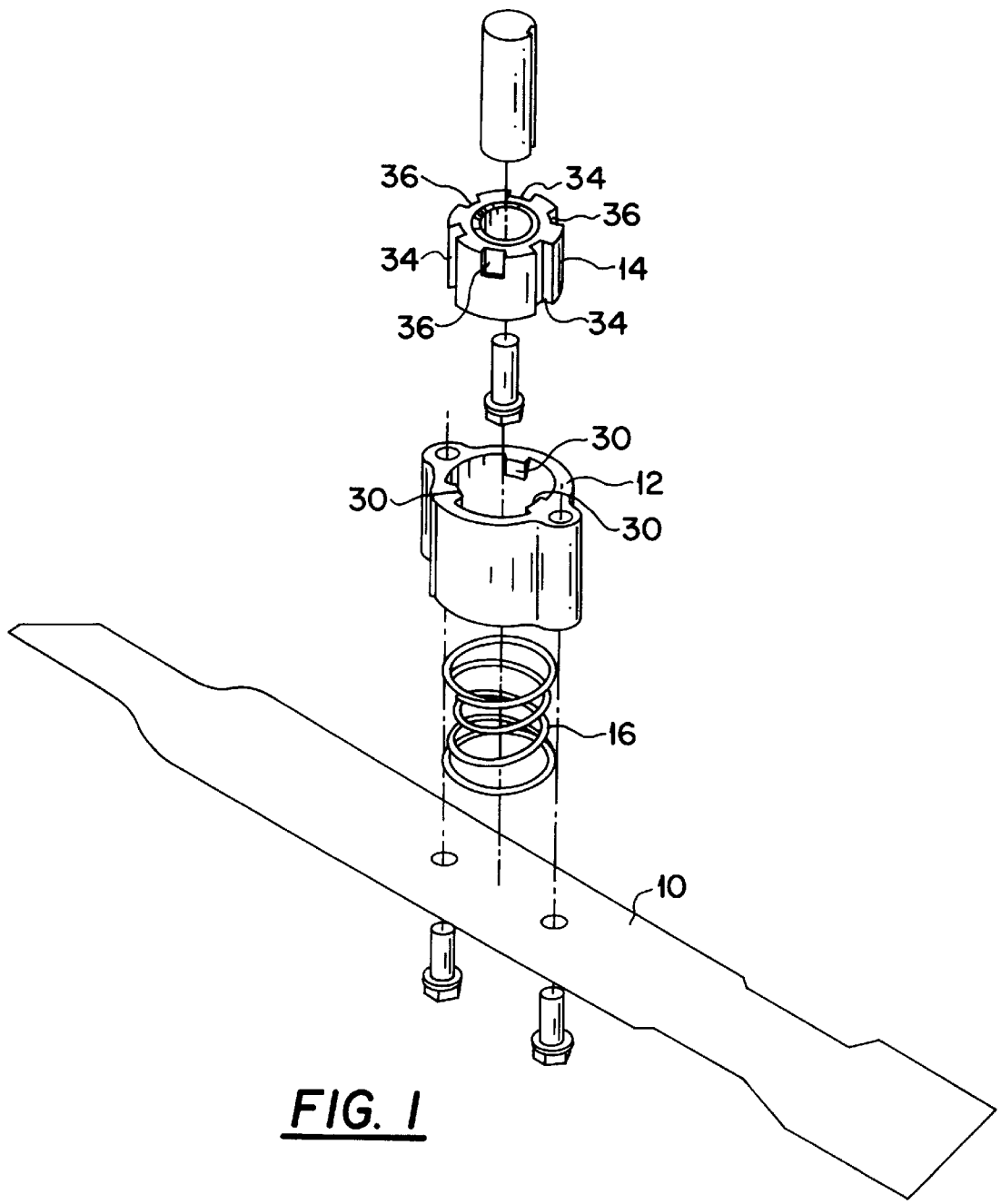
FIG. 1 is an exploded perspective view of a mower blade assembly according to the present invention.

Referring to FIG. 1, the invention consists of four basic components: a blade 10, a blade adapter 12, a fixed adapter 14 and a compression spring 16.

The blade adapter 12 (shown in greater detail in FIG. 4) comprises a substantially cylindrical element 18 having diametrically opposed outer ears 20 and 22 which are provided with internally threaded bores 24 and 26, respectively. These bores permit blade 10 to be secured to the blade adapter 12 by bolts, as can be appreciated from FIG. 1. A substantially cylindrical inner wall 28 of element 18 is provided with a plurality of inwardly projecting, and equally spaced, ears 30 which have lengths corresponding to a portion of the length of element 18.

Figure 5:
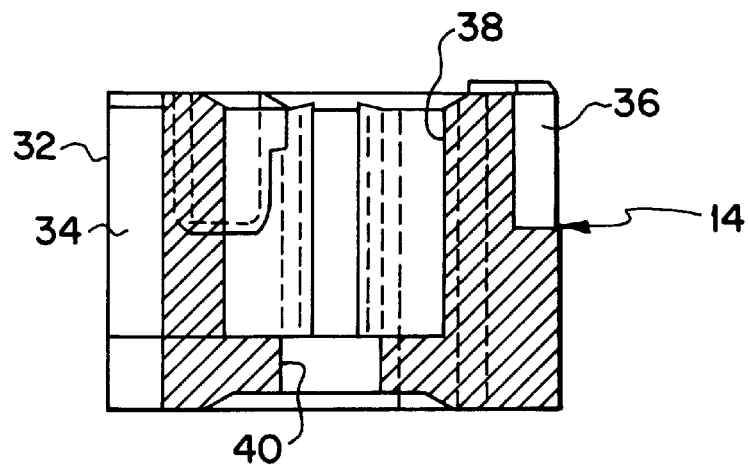
FIG. 5 is side elevational view, partially in section, of a fixed adapter forming a further portion of the blade assembly shown in FIG. 1.
Figure 4:
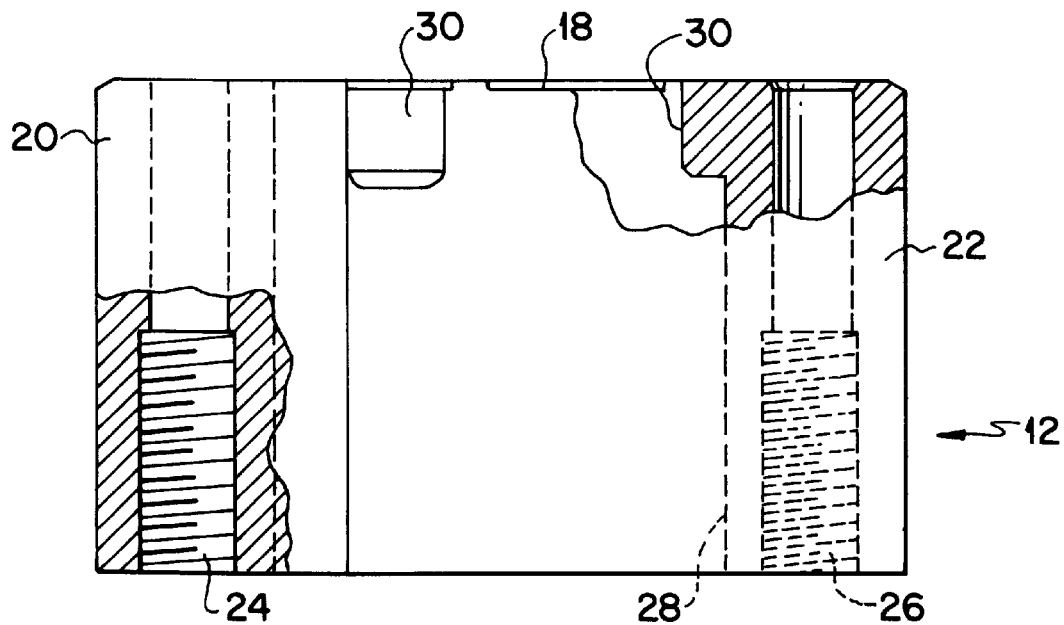
FIG. 4 is a side elevational view, partially in section, of a blade adapter forming a portion of the blade assembly shown in FIG. 1.

The fixed adapter 14 (shown in greater detail in FIG. 5) comprises a generally cylindrical body 32 having an outer diameter which is slightly less than the inner diameter of the blade adapter 12 defined by the inner wall 28 of element 18 (FIG. 4). The outer wall of body 32 is provided with grooves 34 which are spaced to correspond with the spacing of the ears 30 of the blade adapter 12 and which extend for the entire length of body 32. Additionally, the outer wall of body 32 includes at its upper end additional grooves 36 disposed between grooves 34. The grooves 36 also are spaced to correspond with the spacing of ears 30 of the blade adapter 12. Moreover, the grooves 36 are dimensioned in width, depth and length to substantially correspond to the dimensions of the ears 30 whereby ears 30 can be received within respective grooves 36.

Body 32 of the fixed adapter 14 also is provided at its upper end with a cylindrical recess 38 having a diameter slightly greater than the drive shaft of a mower engine. The bottom of recess 38 is provided with an opening 40 to permit the fixed adapter 14 to be secured by a bolt to the end of the mower's engine drive shaft in a manner which can be understood by reference to FIG. 1.

Figure 2:
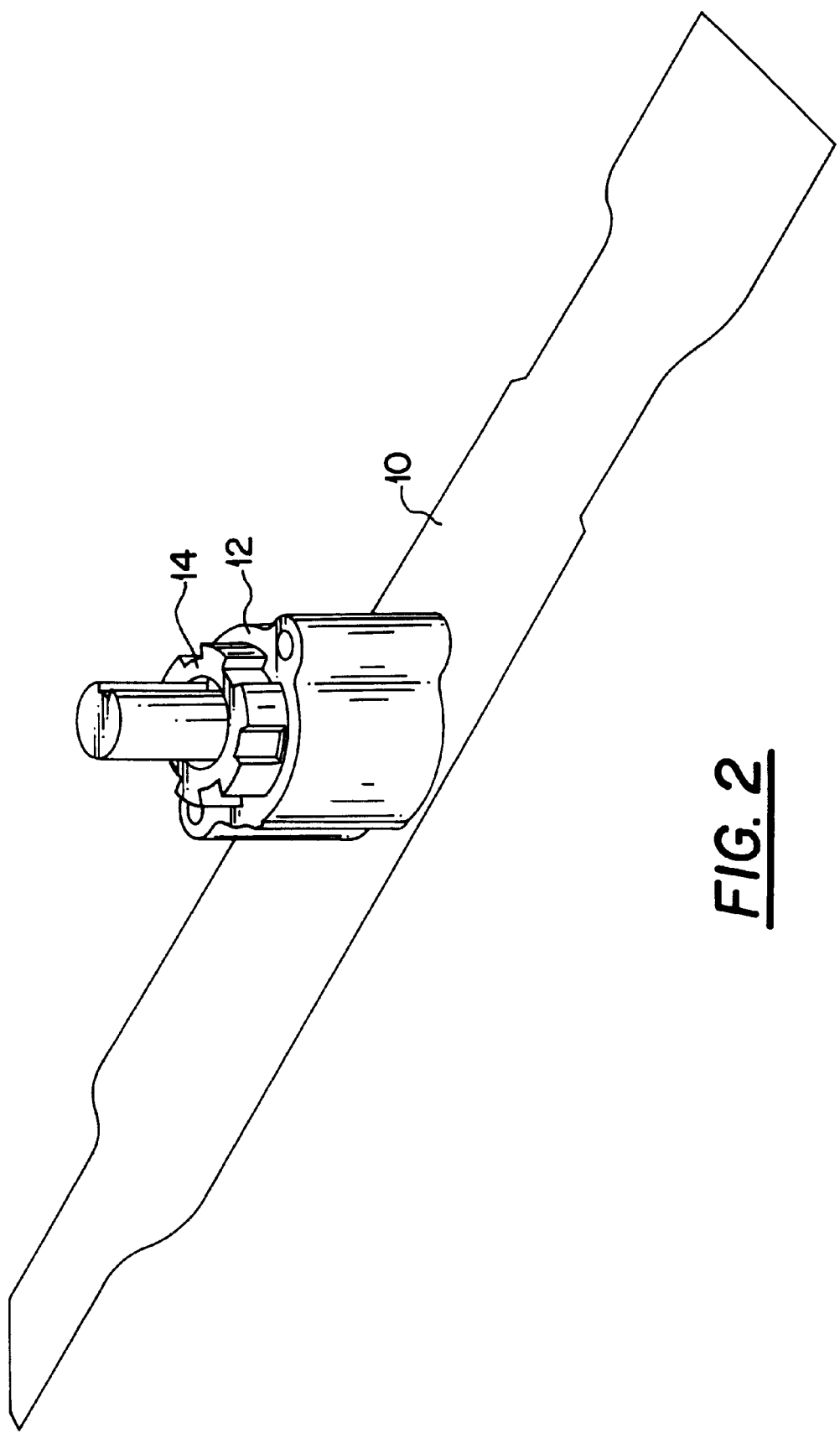
FIG. 2 illustrates the blade assembly of FIG. 1 in an intermediate position at which the blade is either being attached to or removed from the mower.
Figure 3:
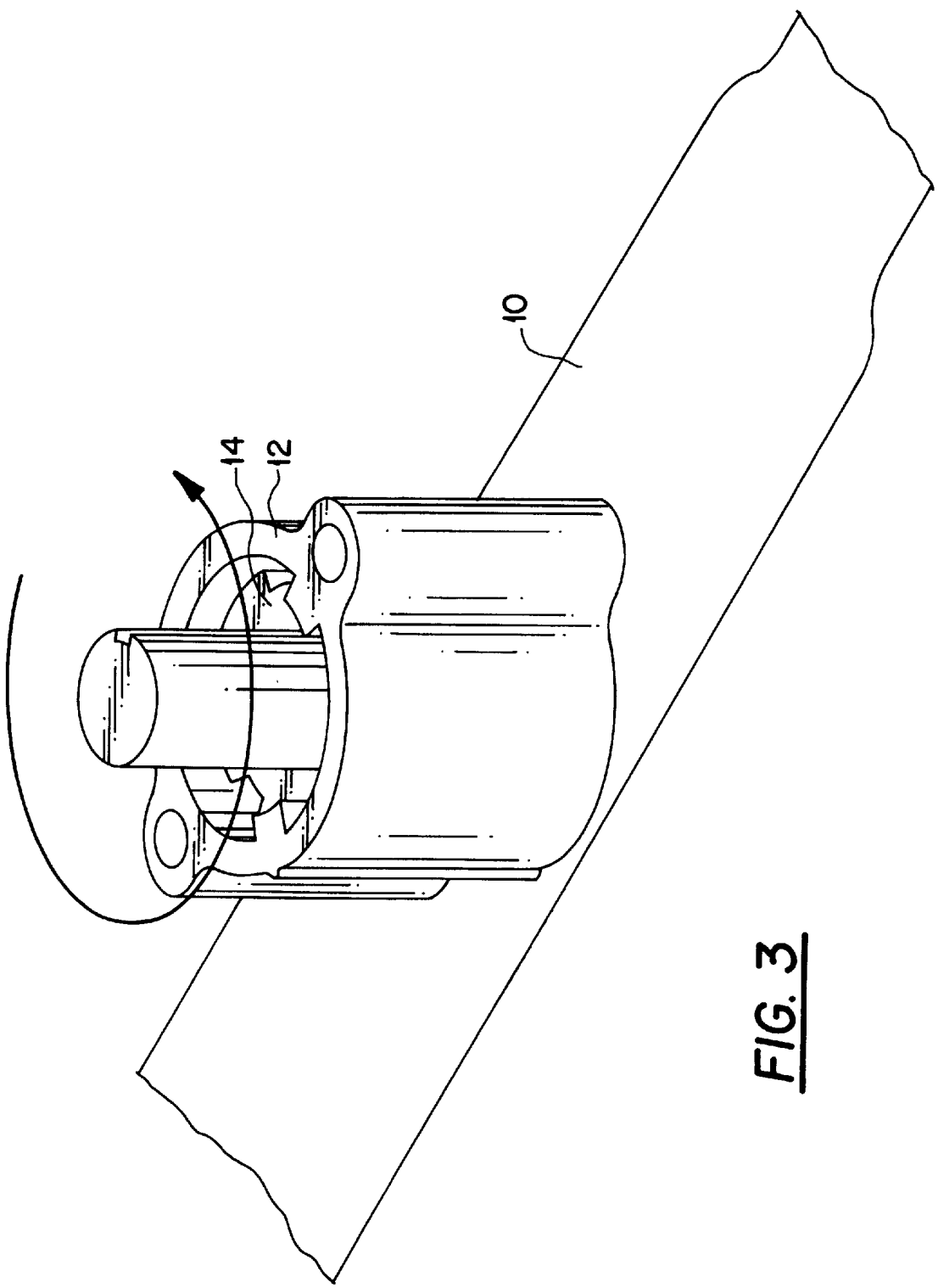
FIG. 3 is an enlarged fragmented view illustrating the blade assembly of FIG. 1 in a locked position relative to the mower.

The length of the fixed adapter 14 is substantially less than that of the blade adapter 12 for a reason which will become apparent from the description of the blade assembly which now will be presented with particular reference to FIGS. 1-3.

With blade 10 secured to the blade adapter 12 and the fixed adapter 14 secured to the mower engine drive shaft in the manner previously described, the compression spring 16 is inserted within element 18. The ears 30 of the blade adapter 12 are aligned with the grooves 34 of the fixed adapter 14, and the blade adapter is slipped onto the fixed adapter (FIG. 2). This occurs with pressure force so that spring 16 is compressed. When the lower edges of the ears 30 are positioned above the upper surfaces of the fixed adapter, the blade adapter is rotated relative to the fixed adapter (as indicated in FIG. 3) to move ears 30 out of alignment with the grooves 34. Such relative rotation continues until the ears 30 are in alignment with the additional grooves 36. When such positioning occurs and the blade adapter 12 is released, the force imparted by spring 16 causes the ears 30 to drop into the additional grooves 36 whereby the blade 10 is locked in position relative to engine drive shaft.

To remove the blade from the locked position, the joined blade and blade adapter are forced upwardly towards the engine drive shaft. This compresses spring 16 and permits the blade adapter to move longitudinally relative to the fixed adapter until once again the lower edges of the ears 30 are above the upper surface of the fixed adapter. When this occurs, the blade adapter is rotated relative to the fixed adapter until ears 30 are in alignment with grooves 34, at which point the blade adapter can be slipped off the fixed adapter.

Once the blade has been removed from the detached blade adapter, it can be sharpened, or replaced and then resecured to the mower in the manner described above. Alternatively, a different type of blade (e.g., a mulching blade) can be installed on the mower in substitution for the previous blade.

What is claimed is:

1. A blade assembly for a rotary mower, comprising:
   a blade adapter for removably retaining a mower blade, said adapter having an upper end provided with an opening for receiving a compression spring, said blade adapter further including a plurality of inwardly projecting ears disposed in spaced relationship within the opening at said upper end thereof;
   a fixed adapter dimensioned to be received within the opening in the blade adapter and having an upper end in which a cavity is formed, said cavity being dimensioned to receive an engine drive shaft of said rotary mower;
   said fixed adapter further including:
   (a) a first plurality of grooves disposed on an outer surface of the fixed adapter and extending from said upper end for the entire length of the fixed adapter, said grooves being spaced to correspond to the spacing of said ears; and
   (b) a second plurality of correspondingly spaced grooves disposed on said outer surface in angularly offset relationship to said first plurality of grooves, said second plurality of grooves extending from said upper end of the fixed adapter and being dimensioned in length, width and depth to substantially correspond with the dimensions of said ears; and
   securing means for connecting the blade to a lower end of blade adapter.

2. A blade assembly according to claim 1, wherein said fixed adapter has a length less than the distance between the upper and lower ends of the blade adapter.

3. A blade assembly according to claim 2, wherein said compression spring is disposed between the lower ends of the blade and fixed adapters when the fixed adapter is received within the blade adapter.

4. A blade assembly according to claim 1, wherein said opening in the blade adapter defines a substantially cylindrical inner wall and wherein the outer surface of the fixed adapter is substantially cylindrical.

5. A blade assembly according to claim 1, wherein said blade adapter further includes a pair of diametrically opposed outer ears provided with internally threaded bores and wherein the blade securing means includes bolts which pass through said blade and are received within respective bores in the blade adapter.

6. A blade assembly according to claim 1, further comprising securing means for connecting the fixed adapter to the engine drive shaft, said securing means including a bolt which passes through the fixed adapter into said cavity to engage the drive shaft.

* * * * *